United States Patent Office 3,131,023
Patented Apr. 28, 1964

3,131,023
PROCESS FOR PURIFYING CRUDE
CALCIUM CYANATE
Herbert A. Baskin, Covington, Tenn., assignor to W. R. Grace & Co., New York, N.Y., a corporation of Connecticut
No Drawing. Filed Mar. 28, 1963, Ser. No. 268,544
7 Claims. (Cl. 23—75)

This invention relates to calcium cyanate. More particularly it relates to the purification of calcium cyanate.

In summary this invention is directed to the purification of impure calcium cyanate containing at least about 35% $Ca(OCN)_2$, the balance being impurities comprising essentially calcium carbonate and calcium oxide and/or hydroxide and about 0–1% urea, by extracting the crude material with a $C_{1-2}$ alkanol, i.e., methanol or ethanol, whereby the calcium cyanate is dissolved and the other calcium compounds are left as solid residue, followed by separating the extraction liquor from the residue, and stripping the solvent at reduced pressure from the calcium cyanate, which is then recovered as purified product assaying at least 90% $Ca(OCN)_2$ and generally 96–97%.

Preferred embodiments include the use of methanol as the solvent, 5–15 ml. of solvent per gram of crude calcium cyanate, extracting at substantially room temperature, and stripping the solvent from the extraction liquor at a temperature of from about 0° C. to 50° C. under a reduced pressure not exceeding about 400 mm. mercury absolute, and pre-treating crude calcium cyanate containing more than about 1% urea to reduce the urea content to not more than about 1% before extraction.

Impure calcium cyanate suitable for purification by this invention is available by several known means. For example, it can be prepared in the known way by reacting a basic calcium compound, such as the oxide or hydroxide, with a nitrogenous substance such as urea, dicyandiamide, or polymers or pyrolytic deamination products of the latter. Crude calcium cyanate prepared by such routes generally contains 35–60% calcium cyanate and as much as about 35% calcium carbonate and about 15 to 30% calcium oxide and/or calcium hydroxide. If prepared from calcium hydroxide, it will contain unreacted calcium hydroxide as impurity, possibly with a very minor amount of calcium oxide; if from calcium oxide, the amount of calcium hydroxide impurity is generally negligible unless the crude produce has been exposed to moist air. The thus prepared calcium cyanate may be substantially freed of all these impurities (which are substantially insoluble in methanol and ethanol) by extracting with methanol or ethanol at ambient or elevated temperature, separating the solution from the residue, and evaporating the respective alcohol from the solute. Although I prefer to use absolutely dry methanol or ethanol as solvent for the purification of crude calcium cyanate, substantially anhydrous methanol or ethanol (containing not more than about 1% water) can be used. Since crude calcium cyanate as generally made by the reaction of urea with a basic calcium compound may contain about 5 to 10% unreacted urea and since urea is very soluble in methanol, the extraction procedure when applied to such crude calcium cyanate concentrates such urea in the final product. For many uses small amounts of urea are unobjectionable in the purified calcium cyanate product. If a lower urea content is required, however, the difficulty can be overcome by reducing the urea content of the crude calcium cyanate to less than about 1% previous to the extraction. A preferred method for reducing the urea content of such crude calcium cyanate is given elsewhere in this specification.

Such preliminary treatment is unnecessary, and in fact, it is undesirable when purifying crude calcium cyanate made from non-urea nitrogen sources such as dicyandiamide or melamine.

I prefer to extract calcium cyanate from the crude cyanate with a $C_{1-2}$ alcohol at ambient temperature, but elevated temperatures may be used.

My interest in developing a method for purifying calcium cyanate came about because I had developed an economically attractive process (described in my copending application, Serial No. 209,250) for preparing crude calcium cyanate which is suitable for agricultural uses but which is not satisfactory for use in many organic syntheses. There exists a need for inexpensive high purity calcium cyanate suitable for use in the syntheses of organic isocyanates, organic carbamates, and derivatives of these materials. Accordingly, the process herein described was developed to fill this need.

Prior to my invention it has not been possible to purify calcium cyanate by solvent extraction due to lack of specificity on the part of many solvents and to the fact that cyanates react with many solvents such as water, wet ethanol, and acids to form substances which would dissolve in the solvent and subsequently precipitate with the calcium cyanate. Among the materials known to form by contact of metal cyanates with various solvents are organic carbamates, allophanates, an cyanuric acid. The presence of these materials tends to reduce both purity and yield of the end product.

Previous to my invention calcium cyanate of moderate purity (ca. 85–91% $Ca(OCN)_2$) was prepared by an elaborate procedure that involved the reaction of about stoichiometrical proportions of an intimate mixture of micron-size particles of highly pure calcium oxide and micron-size particles of pure urea. This was a difficult and tedious process. Practically all calcium oxide contains calcium carbonate which yields little or no calcium cyanate when heated with a nitrogen source such as urea or dicyandiamide, and powdered quick lime is rapidly converted to calcium carbonate by carbon dioxide from the atmosphere. Furthermore, grinding urea to micron-size particles is a troublesome process. Urea is resistant to grinding and abrasion, and pulverized urea rapidly sets into hard lumps and cakes which will not mix intimately with powdered lime.

I have made the surprising discovery that methyl and ethyl alcohols are satisfactory solvents for the purification of crude calcium cyanate. This is surprising because, contrary to my expectations, I discovered, for example, that methanol (even when containing up to about 1% water) does not react with the dissolved cyanate to form detectable quantities of carbamate. This is true even at the boiling point of the solution. In my process the cyanate is extracted from crude calcium cyanate by the alcohol, the solution is separated from the insoluble residue (principally calcium compounds), and the solvent is evaporated. In the evaporation step I have found it necessary to use reduced pressure (i.e., not more than substantially 400 mm. Hg absolute) with or without heat to evaporate the alcohol from the solution. If heat is used, the temperature should not exceed about 50° C.

Crude calcium cyanate prepared from urea and a basic calcium compound usually contains unreacted urea. In the case of that prepared from urea according to the process of my aforesaid copending application, the urea assay is about 10% while calcium cyanate prepared from urea by other processes may contain about 5–25% or more unreacted urea. I have found that this unreacted urea is extracted by methanol or ethanol and precipitated with the cyanate when the solvent is evaporated thereby yielding a product analyzing about 75–90% or less calcium cyanate and about 10–25% or more urea. Calcium cyanate containing this amount of urea is of little value in most organic syntheses. However, I have found that the unreacted urea content of such crude calcium cyanate can be reduced greatly by passing the crude material through a heated reaction zone. A suitable reaction zone is described in my aforesaid copending application, namely, an externally heated barrel with a close-fitting helical screw conveyor, rotating at a rate such that the calcium cyanate reaction mixture is moved through the barrel at a residence time of at least about ½ minute. Temperatures of about 200–275° C. can be used in this pretreatment, but I prefer the range of about 220–260° C. When crude calcium cyanate containing calcium oxide or calcium hydroxide in amounts at least stoichiometrically equivalent to its urea content is subjected to this treatment, substantially all of the urea present reacts with the calcium oxide or hydroxide to form calcium cyanate. Most crude calcium cyanate formed from urea and CaO or $Ca(OH)_2$ contains sufficient calcium oxide or hydroxide, but additional calcium oxide or hydroxide may be added if needed. (The stoichiometry requires at least 0.5 mole calcium oxide or hydroxide per mole of urea.) Two or three passes, each with a residence time of about ½–1 minute, through the hot reaction zone are usually sufficient to reduce the urea content of the crude calcium cyanate to less than about 1%. Additional passes through the heated zone have failed to produce any further substantial decrease in the urea content of the crude calcium cyanate. When the thus treated crude calcium cyanate is extracted with methyl or ethyl alcohol, calcium cyanate and most of the small amount of remaining urea are dissolved; both are precipitated when the alcohol is evaporated from the resulting solution. However, the absolute quantity of urea present in crude calcium cyanate analyzing less than about 1% urea is such that, even when allowance is made for the concentrating effect of the extraction-precipitation process, the final purified calcium cyanate will not contain more than about 3% urea.

My invention is further illustrated by the following examples which are illustrative only and which are not intended to limit the scope of the invention.

EXAMPLE I

*Pre-Treatment to Reduce Urea Content*

A kilogram of crude calcium cyanate synthesized from calcium oxide and urea and analyzing 43% $Ca(OCN)_2$, 35% $CaCO_3$, 12% CaO, and 10% urea was subjected to 3 passes through a heated zone of the type above described, maintained at about 240–250° C. Residence time per pass was about ½ minute. Product from the third pass weighed 940 g. and analyzed 46% $Ca(OCN)_2$ and about 1% urea; the remainder was $CaCO_3$ and CaO.

EXAMPLE II

*Methanol Extraction With Cold Stripping*

A 40 g. portion of pre-treated crude calcium cyanate from Example I was placed in a flask and agitated at room temperature for 15 minutes with 500 ml. of methyl alcohol. The mixture was filtered. The filtrate was composed of calcium cyanate, urea, and a trace of calcium oxide or hydroxide dissolved in methyl alcohol. The residue consisted of calcium carbonate, calcium oxide, some undissolved calcium cyanate, and a trace of urea. The filtrate was placed in a 2 liter round bottom flask. The flask was attached to a Rinco rotary evaporator, and suction from a water pump was applied to the system, reducing the pressure to about 50 mm. Hg absolute, while maintaining the solution temperature at 0–5° C. Solid product weighing 9 g. and analyzing 96% $Ca(OCN)_2$ was recovered by evaporating to dryness.

EXAMPLE III

*Methanol Extraction With Hot Stripping*

A 50 g. portion of pre-treated crude calcium cyanate from Example I was agitated for 15 minutes with 500 ml. of methyl alcohol. The resulting slurry was filtered, and the filtrate was placed in a 2 liter round bottom flask attached to a Rinco rotary evaporator. The solution was evaporated to dryness under reduced pressure (about 400 mm. Hg absolute) at 40–50° C. This procedure was repeated with three more 50 g. portions of the crude calcium cyanate. Solid product obtained by evaporating the combined filtrates weighed 67 g. and analyzed 96% $Ca(OCN)_2$ and 3% urea.

EXAMPLE IV

*Extraction With Recycled Methanol*

A 150 g. portion of pre-treated crude calcium cyanate from Example I was agitated with 1500 ml. of methyl alcohol for 15 minutes. The 1500 ml. portion of methyl alcohol used in this run was prepared by mixing 900 ml. of methanol recovered from Example III with 600 ml. of the fresh solvent. The slurry was filtered. The filtrate was placed in a 2 liter round bottom flask attached to the Rinco rotary evaporator, and suction was applied to the system (about 300 mm. Hg absolute) while maintaining the temperature at 40° C. Solid product weighing 26 g. and analyzing 97% $Ca(OCN)_2$ was recovered.

EXAMPLE V

*Extraction With Ethanol*

A 48 g. sample of pre-treated material from Example I was extracted with 480 ml. of ethanol using the procedure of Example III (40–50° C., 250 mm. Hg absolute). Purified calcium cyanate was recovered, weight 1.8 g., assay 90% $Ca(OCN)_2$.

EXAMPLE VI

*Extraction of Urea-Free Material*

A 50 g. portion of urea-free crude calcium cyanate (40% $Ca(OCN)_2$) prepared by heating calcium oxide with dicyandiamide was agitated for 15 minutes with 500 ml. of methyl alcohol. The slurry was filtered, and the filtrate was placed in a 1 liter round bottom flask attached to the Rinco rotary evaporator, and suction was applied to this while maintaining the temperature at about 35° C. (about 230 mm. Hg absolute). Solid product weighing 8.5 g. and analyzing 96% calcium cyanate was recovered.

The following example is a control to show the necessity of low urea in the starting material.

EXAMPLE VII

*Extraction of High-Urea Material*

A 20 g. portion of crude calcium cyanate (40% $Ca(OCN)_2$, 6% urea, balance mostly $CaCO_3$, CaO, and a little $Ca(OH)_2$) was agitated for 15 minutes with 200 ml. of methyl alcohol. The slurry was filtered and the methyl alcohol was evaporated under reduced pressure (about 50 mm. Hg absolute) on a Rinco rotary evaporator while maintaining the temperature at 0–5° C. Solid product weighing 4 g. and analyzing 85% $Ca(OCN)_2$ and 13% urea was recovered.

Various other solvents investigated proved inoperative for the separation. Typical of these are the following experiments.

EXAMPLE VIII

*Attempted Extraction With 2-Propanol*

A 50 g. portion of pre-treated crude calcium cyanate from Example I was agitated for 15 minutes with 500 ml. of isopropyl alcohol. The slurry was filtered and the filtrate was evaporated on a Rinco rotary evaporator at 40–50° C. (about 200 mm. Hg absolute). Solid product weighing 0.3 g. was recovered; this material was insoluble in methyl alcohol, and contained only trace quantities of calcium cyanate. The product was not investigated further.

EXAMPLE IX

*Attempted Extraction With Water*

A 50 g. portion of pre-treated crude calcium cyanate from Example I was agitated for 15 minutes with 500 ml. of water. The slurry was filtered, and the filtrate was evaporated on a Rinco rotary evaporator at 40–50° C. (about 100 mm. Hg absolute). Solid product weighing 22 g. and analyzing 61% $Ca(OCN)_2$ was recovered.

EXAMPLE X

*Attempted Extraction With $NH_3$*

A 20 g. portion of pre-treated crude calcium cyanate from Example I was extracted with 100 g. of anhydrous liquid ammonia. The mixture was allowed to settle, and 73 g. of clear liquid was removed by decantation. After evaporating the ammonia, solid product weighing 6.7 g. and analyzing 53% $Ca(OCN)_2$ was recovered. This product was not investigated further.

What is claimed is:

1. Purification of impure calcium cyanate containing at least about 35% calcium cyanate, the balance being impurities consisting essentially of calcium carbonate, at least one member selected from the group consisting of calcium oxide and calcium hydroxide, and about 0–1% urea, comprising extracting the said impure calcium cyanate with a substantially anhydrous $C_{1-2}$ alkanol containing not more than about 1% water, whereby the calcium cyanate is dissolved in the alkanol to form an extraction liquor, separating the extraction liquor from the residual solids, evaporating the solvent at 0–50° C. under reduced pressure not exceeding 400 mm. of mercury absolute, and recovering calcium cyanate in a purity of at least 90%.

2. Method in accordance with claim 1 in which the alkanol is methanol.

3. Method in accordance with claim 1 in which the alkanol is ethanol.

4. Method according to claim 1 wherein the alkanol is evaporated at ambient temperature.

5. Method according to claim 1 wherein the alkanol is evaporated by heating said solution at a temperature up to about 50° C.

6. Method according to claim 1 in which crude calcium cyanate is pre-treated prior to extraction, said pre-treatment comprising heating at a temperature of 200–275° C. for at least about ½ minute crude calcium cyanate containing at least 35% calcium cyanate, more than about 1% urea, about 35% calcium carbonate, and sufficient basic calcium compound of the group consisting of calcium oxide and calcium hydroxide to provide at least 0.5 mole of said basic calcium compound per mole of urea, thereby to form impure calcium cyanate containing not more than about 1% urea.

7. Method according to claim 6 wherein the crude calcium cyanate is conveyed through said heated reaction zone at a rate which provides a residence time of at least about ½ minute while maintaining the temperature of the moving mass between 220–260° C.

References Cited in the file of this patent

FOREIGN PATENTS

| | | |
|---|---|---|
| 339,371 | Great Britain | Dec. 11, 1930 |
| 354,604 | Great Britain | Aug. 13, 1931 |